(12) United States Patent
Matsui et al.

(10) Patent No.: US 8,914,956 B2
(45) Date of Patent: Dec. 23, 2014

(54) MANUFACTURING METHOD FOR MONOLITHIC CERAMIC ELECTRONIC COMPONENT

(71) Applicant: Murata Manufacturing Co., Ltd., Nagaokakyo-shi, Kyoto-fu (JP)

(72) Inventors: Togo Matsui, Nagaokakyo (JP); Minoru Dooka, Nagaokakyo (JP); Hiroyoshi Takashima, Nagaokakyo (JP); Kenichi Okajima, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/915,640

(22) Filed: Jun. 12, 2013

(65) Prior Publication Data

US 2013/0276955 A1     Oct. 24, 2013

Related U.S. Application Data

(62) Division of application No. 13/418,464, filed on Mar. 13, 2012, now Pat. No. 8,584,332.

(30) Foreign Application Priority Data

Mar. 14, 2011  (JP) ................................ 2011-055000
Feb. 7, 2012   (JP) ................................ 2012-024232

(51) Int. Cl.
| | |
|---|---|
| H01G 7/00 | (2006.01) |
| H01G 4/30 | (2006.01) |
| H01G 13/00 | (2013.01) |
| H01G 4/002 | (2006.01) |
| H01G 4/12 | (2006.01) |

(52) U.S. Cl.
CPC ................. *H01G 4/30* (2013.01); *H01G 13/00* (2013.01); *H01G 4/002* (2013.01); *H01G 4/12* (2013.01)
USPC ............................. 29/25.42; 29/41; 361/305

(58) Field of Classification Search
USPC .................. 29/25.35–25.42, 25.03, 829–830, 29/846–847; 361/301.4, 303; 156/89.12
See application file for complete search history.

(56) References Cited

U.S. PATENT DOCUMENTS

| 8,584,332 B2* | 11/2013 | Matsui et al. ................ 29/25.42 |
| 2008/0128157 A1 | 6/2008 | Murata et al. |
| 2010/0085682 A1 | 4/2010 | Abe et al. |

FOREIGN PATENT DOCUMENTS

| CN | 101129103 A | 2/2008 |
| CN | 101714455 A | 5/2010 |
| JP | 2008-147211 A | 6/2008 |

OTHER PUBLICATIONS

Official Communication issued in corresponding Chinese Patent Application No. 201210059177.X, mailed on Apr. 3, 2014.
Matsui et al., "Manufacturing Method for Monolithic Ceramic Electronic Component", U.S. Appl. No. 13/418,464, filed Mar. 13, 2012.

* cited by examiner

*Primary Examiner* — Minh Trinh
(74) *Attorney, Agent, or Firm* — Keating & Bennett, LLP

(57) ABSTRACT

In a manufacturing method for a monolithic ceramic electronic component, a ceramic paste is applied by using an application plate to a side surface of each of a plurality of green chips arrayed in row and column directions which are obtained after cutting a mother block. In the applying step, the ceramic paste is transferred to the side surface by moving the green chips and the application plate relative to each other in the direction in which the side surface extends while separating the green chips from the application plate, in a state where the ceramic paste is connected to both the green chips and the application plate.

6 Claims, 16 Drawing Sheets

MANUFACTURING METHOD FOR MONOLITHIC CERAMIC ELECTRONIC COMPONENT

BACKGROUND OF THE INVENTION

1. Field of the Invention

The present invention relates to a manufacturing method for a monolithic ceramic electronic component, and more specifically, to a method for forming a protective area at the side of internal electrodes in a monolithic ceramic electronic component.

2. Description of the Related Art

A monolithic ceramic capacitor exists as an example of a monolithic ceramic electronic component to which the present invention is directed. To manufacture a monolithic ceramic capacitor, typically, a step as illustrated in FIGS. 22A and 22B is performed. That is, a first ceramic green sheet 3 on which a first internal electrode 1 is formed, and a second ceramic green sheet 4 on which a second internal electrode 2 is formed are alternately stacked in a plurality of layers. A raw component body is obtained by this stacking step. After the raw component body is fired, first and second external electrodes are formed on opposing first and second end surfaces of the sintered component body. Thus, the first and second internal electrodes 1 and 2 led out to the first and second end surfaces are electrically connected to the first and second external electrodes, respectively, and a monolithic ceramic capacitor is completed.

In recent years, monolithic ceramic capacitors are steadily decreasing in size, while monolithic ceramic capacitors that can provide high capacitance are being desired. To meet such a demand, it is effective to increase the effective area occupied by each of the internal electrodes 1 and 2 on the stacked ceramic green sheets 3 and 4, that is, the opposing area of the internal electrodes 1 and 2. To increase such an effective area, it is important to reduce the dimensions of a protective area 5 at the side and the dimensions of a protective area 6 at the end illustrated in FIGS. 22A and 22B.

However, reducing the dimensions of the protective area 6 at the end undesirably increases the risk of short-circuiting of the first external electrode and the second external electrode via either one of the internal electrodes 1 and 2. Accordingly, it is appreciated that considering the reliability of the monolithic ceramic capacitor, it is more preferable to reduce the dimensions of the protective area 5 at the side than to reduce the dimensions of the protective area 6 at the end.

An example of an effective method for reducing the dimensions of the protective area 5 at the side is described in Japanese Unexamined Patent Application Publication No. 3-108306. According to the method described in Japanese Unexamined Patent Application Publication No. 3-108306, a laminate is prepared which has a laminated structure including a plurality of ceramic layers and a plurality of internal electrodes that are in a raw state, with the internal electrodes being exposed on its side surface, and this laminate is dipped in a ceramic slurry to thereby form the protective area at the side.

However, the technique described in Japanese Unexamined Patent Application Publication No. 3-108306 mentioned above has the following problems.

That is, when dipping the laminate in the ceramic slurry, the ceramic slurry is also applied onto a surface of the laminate other than the surface that is to become the protective area at the side, for example, the principal surface. Moreover, in the case of applying the ceramic slurry by dipping, the control for making the thickness of the applied ceramic slurry uniform is not easy. For example, as illustrated in FIG. 23, when a ceramic slurry 8 is applied to a laminate 7, owing to the surface tension acting on the ceramic slurry 8, at corners 9 of the laminate 7, the applied thickness of the ceramic slurry 8 tends to become thin, making it difficult to secure a desired applied thickness. For these reasons, water tends to enter from the corners 9, leading to a decrease in reliability in some cases. Moreover, the monolithic ceramic capacitor obtained is prone to dimensional variations.

Similar problems can be encountered not only when manufacturing monolithic ceramic capacitors but also when manufacturing monolithic ceramic electronic components other than monolithic ceramic capacitors.

SUMMARY OF THE INVENTION

Accordingly, preferred embodiments of the present invention provide a manufacturing method for a monolithic ceramic electronic component that can address the above-mentioned problems.

According to a preferred embodiment of the present invention, a manufacturing method for a monolithic ceramic electronic component first includes the steps of preparing a mother block, the mother block including a plurality of ceramic green sheets that are stacked on each other, and an internal electrode pattern arranged along each of a plurality of interfaces between the ceramic green sheets, and cutting the mother block along a first cutting line and a second cutting line extending in mutually perpendicular or substantially perpendicular directions to obtain a plurality of green chips, the green chips each having a laminated structure including a plurality of ceramic layers and a plurality of internal electrodes that are in a raw state, the internal electrodes being exposed on a cut side surface that is produced by cutting along the first cutting line.

Next, after performing the step of applying a ceramic paste to the cut side surface to form a raw ceramic protective layer and obtain a raw component body, the step of firing the raw component body is performed.

In the manufacturing method mentioned above, the applying step includes the steps of preparing an application plate that holds the ceramic paste, bringing the ceramic paste held by the application plate into contact with the cut side surface of each of the green chips, and transferring the ceramic paste to the cut side surface of each of the green chips, by moving each of the green chips and the application plate relative to each other in a direction in which the cut side surface extends while separating each of the green chips from the application plate in a state in which the ceramic paste is connected to both of each of the green chips and the application plate.

According to a preferred embodiment of the present invention, the green chips cut in the cutting step are arrayed in row and column directions, the applying step further includes the step of tumbling the green chips in a state in which the green chips arrayed in the row and column directions are spaced apart from each other, to make the cut side surface of each of the green chips uniformly an open surface, and in the applying step, the ceramic paste is simultaneously applied to the cut side surface of each of the green chips that has become the open surface as a result of the tumbling step.

According to a preferred embodiment of the present invention, a manufacturing method for a monolithic ceramic electronic component includes the steps of preparing a mother block, the mother block including a plurality of ceramic green sheets that are stacked, and an internal electrode pattern arranged along each of a plurality of interfaces between the ceramic green sheets, performing first cutting, the first cutting including cutting the mother block along a first cutting line to obtain a plurality of rod-shaped green block bodies, the rod-shaped green block bodies each having a laminated structure including a plurality of ceramic layers and a plurality of internal electrodes that are in a raw state, the internal electrodes being exposed on a cut side surface that is produced by cutting along the first cutting line, applying a ceramic paste to the cut side surface to form a raw ceramic protective layer, performing second cutting, the second cutting including cutting each of the rod-shaped green block bodies on which the raw ceramic protective layer has been formed, along a second cutting line extending in a direction perpendicular or substantially perpendicular to the first cutting line to obtain a plurality of raw component bodies, and firing each of the raw component bodies.

In the manufacturing method mentioned above, the applying step includes the steps of preparing an application plate that holds the ceramic paste, bringing the ceramic paste held by the application plate into contact with the cut side surface of each of the rod-shaped green block bodies, and transferring the ceramic paste to the cut side surface of each of the rod-shaped green block bodies, by moving each of the rod-shaped green block bodies and the application plate relative to each other in a direction in which the cut side surface extends while separating each of the rod-shaped green block bodies from the application plate in a state in which the ceramic paste is connected to both of each of the rod-shaped green block bodies and the application plate.

According to a preferred embodiment of the present invention, the rod-shaped green block bodies cut in the first cutting step are arrayed in a predetermined direction, the applying step further includes the step of tumbling the rod-shaped green block bodies in a state in which the rod-shaped green block bodies arrayed in the predetermined direction are spaced apart from each other, to make the cut side surface of each of the rod-shaped green block bodies uniformly an open surface, and in the applying step, the ceramic paste is simultaneously applied to the cut side surface of each of the rod-shaped green block bodies that has become the open surface as a result of the tumbling step.

According to a preferred embodiment of the present invention, the application plate includes an application surface that abuts against the cut side surface of each of the green chips or the rod-shaped green block bodies and is provided with a recess to hold the ceramic paste, the recess being filled with the ceramic paste.

According to a preferred embodiment of the present invention, the ceramic paste has a viscosity of about 100 to 10000 mPa at about 10 rpm as measured with an E-type viscometer, for example.

According to a preferred embodiment of the present invention, the step of preparing the mother block includes the steps of preparing the ceramic green sheets, forming the internal electrode pattern on each of the ceramic green sheets, and stacking the ceramic green sheets while shifting the ceramic green sheets from each other by a predetermined distance in a predetermined direction.

According to a preferred embodiment of the present invention, the manufacturing method for a monolithic ceramic electronic component may further include the step of forming an external electrode on a predetermined surface of the component body so as to be electrically connected to a specific one of the internal electrodes.

According to a preferred embodiment of the present invention mentioned above, the ceramic paste is applied by using the application plate to the cut side surface of the green chip or the rod-shaped green block body. Therefore, dimensional variations caused by adhesion of the ceramic paste to other surfaces can be suppressed and prevented.

Also, the ceramic paste is transferred to the cut side surface by moving the green chip or the rod-shaped green block body and the application plate relative to each other in a direction in which the cut side surface extends while separating the green chip or the rod-shaped green block body from the application plate in a state in which the ceramic paste is connected to both the green chip or the rod-shaped green block body and the application plate. Therefore, the thickness of the ceramic paste applied on the cut side surface of the green chip or the rod-shaped green block body can be made more uniform.

The above-mentioned applying step is performed preferably by using the application plate including an application surface that abuts against the side of the green chip or the rod-shaped green block body on which the internal electrodes are exposed, and is provided with a recess to hold the ceramic paste, the recess being filled with the ceramic paste. Accordingly, the ceramic paste can be applied to only the cut side surface of the green chip or the rod-shaped green block body more reliably.

A ceramic paste having a viscosity of about 100 mPa to about 10000 mPa at about 10 rpm as measured with an E-type viscometer is used, for example. Accordingly, good shape retention can be obtained for the raw ceramic protective layer formed by application of the ceramic paste. Also, use of the application plate makes it possible to smoothly transfer the ceramic paste from the application plate to the green chip or the rod-shaped green block body.

According to the preferred embodiments of the present invention described above, when the above-mentioned application of the ceramic paste is performed at one time for each of a plurality of green chips arrayed in the row and column directions and whose cut side surface is so oriented as to become an open surface, as in the case of performing the applying step for the rod-shaped green block body, the applying step can be implemented efficiently, and variations in the applied thickness of the ceramic paste among the green chips can be suppressed and prevented.

According to the preferred embodiments of the present invention described above, in a state in which a plurality of rod-shaped green block bodies obtained by performing the first cutting step mentioned above are arrayed in a predetermined direction, when performing the applying step, the tumbling step is performed which includes tumbling the rod-shaped green block bodies in a state in which the rod-shaped green block bodies arrayed in the predetermined direction are spaced apart from each other, thereby making the cut side surface of each of the rod-shaped green block bodies uniformly an open surface, and in the applying step, the ceramic paste is simultaneously applied to the cut side surface of each of the rod-shaped green block bodies that has become the open surface as a result of the tumbling step. Accordingly, the applying step can be implemented even more efficiently, and variations in the applied thickness of the ceramic paste among the raw component bodies obtained in the second cutting step can be further suppressed and prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention are described, with a monolithic ceramic capacitor taken as a non-limiting example of monolithic ceramic electronic component.

FIGS. 1 to 15 illustrate a first preferred embodiment of the present invention.

Figure 1:
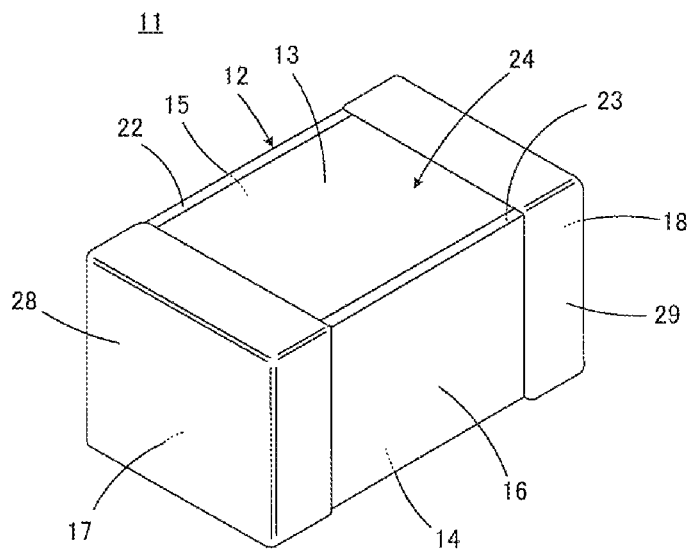
FIG. 1 is a perspective view of the outward appearance of a monolithic ceramic capacitor as an example of a monolithic ceramic electronic component obtained by a manufacturing method according to a first preferred embodiment of the present invention.
Figure 2:
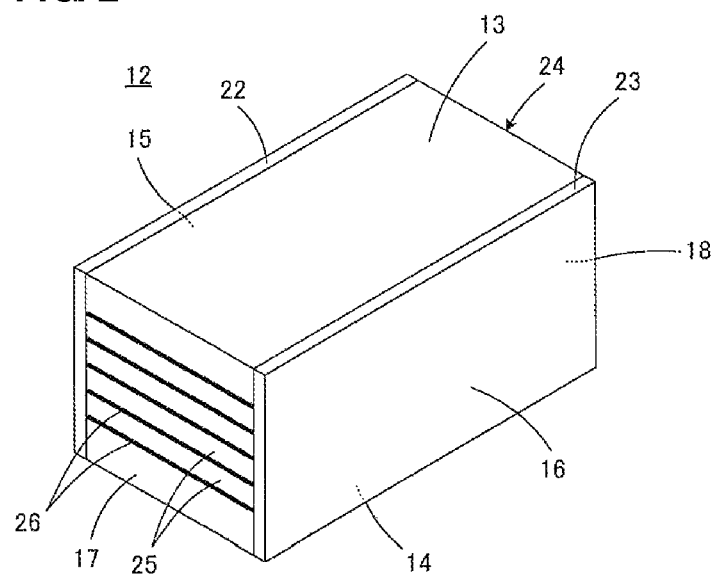
FIG. 2 is a perspective view of the outward appearance of a component body included in the monolithic ceramic capacitor illustrated in FIG. 1.

First, as illustrated in FIG. 1, a monolithic ceramic capacitor 11 includes a component body 12. The component body 12 is illustrated singly in FIG. 2. The component body 12 preferably has a rectangular parallelepiped or substantially rectangular parallelepiped shape including a pair of opposing principal surfaces 13 and 14, a pair of opposing side surfaces 15 and 16, and a pair of opposing first and second end surfaces 17 and 18.

Figure 3:
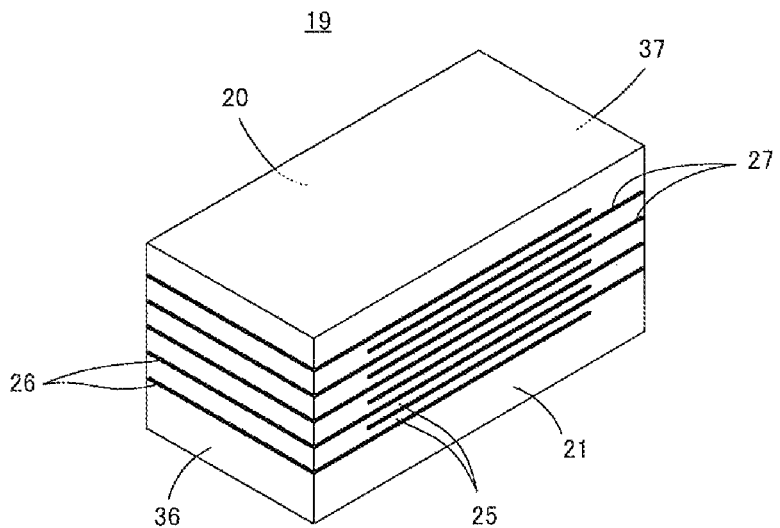
FIG. 3 is a perspective view of the outward appearance of a green chip prepared to obtain the component body illustrated in FIG. 2.

In describing the component body 12 in detail, reference is also made to FIG. 3 illustrating the outward appearance of a green chip 19 prepared to obtain the component body 12. As will be appreciated from a description given later, the component body 12 corresponds to a component body obtained by forming a pair of first and second ceramic protective layers 22 and 23 in their raw state on a pair of opposing first and second side surfaces (hereinafter, referred to as "cut side surfaces") 20 and 21 of the green chip 19 illustrated in FIG. 3 and then firing the resulting green chip 19. In the following description, the portion of the fired component body 12 which is derived from the green chip 19 is referred to as a laminate section 24.

The laminate section 24 in the component body 12 has a laminated structure including a plurality of ceramic layers 25 extending along the direction of the principal surfaces 13 and 14 and stacked in a direction perpendicular or substantially perpendicular to the principal surfaces 13 and 14, and a plurality of pairs of first and second internal electrodes 26 and 27 each formed along the interface between the ceramic layers 25. Also, the component body 12 includes the pair of ceramic protective layers 22 and 23 that are placed on the cut side surfaces 20 and 21 of the laminate section 24 so as to provide the component body 12 with its side surfaces 15 and 16, respectively. The ceramic protective layers 22 and 23 preferably have the same thickness.

While in FIG. 1, the boundary between the laminate section 24 and each of the ceramic protective layers 22 and 23 is depicted clearly, the boundary is depicted clearly for the convenience of description. In actuality, such a boundary does not appear so clearly.

The first and second internal electrodes 26 and 27 oppose each other via each of the ceramic layers 25. This opposing arrangement causes electrical characteristics to manifest themselves. That is, a capacitance is generated in the case of the monolithic ceramic capacitor 11.

The first internal electrodes 26 include an exposed end that is exposed on the first end surface 17 of the component body 12, and the second internal electrodes 27 have an exposed end that is exposed on the second end surface 18 of the component body 12. However, the internal electrodes 26 and 27 are not exposed on the side surfaces 15 and 16 of the component body 12 because the ceramic protective layers 22 and 23 described above are placed on these end surfaces.

The monolithic ceramic capacitor 11 further includes external electrodes 28 and 29. The external electrodes 28 and 29 are arranged on at least the pair of end surfaces 17 and 18 of the component body 12 so as to be electrically connected to the exposed ends of the internal electrodes 26 and 27, respectively.

As the conductive material for the internal electrodes 26 and 27, for example, Ni, Cu, Ag, Pd, Ag—Pd alloy, Au, or other suitable material may preferably be used.

As the ceramic material forming the ceramic layers 25 and the ceramic protective layers 22 and 23, for example, a dielectric ceramic containing $BaTiO_3$, $CaTiO_3$, $SrTiO_3$, $CaZrO_3$, or other suitable material as its principal component may preferably be used.

Preferably, at least the principal component of the ceramic material forming the ceramic protective layers 22 and 23 is the same as that of the ceramic material forming the ceramic layers 25. In this case, most preferably, a ceramic material of the same composition is used for both the ceramic layers 25 and the ceramic protective layers 22 and 23.

The present invention is also applicable to a monolithic ceramic electronic component other than a monolithic ceramic capacitor. In a case where the monolithic ceramic electronic component is a piezoelectric component, a piezoelectric ceramic such as a PZT ceramic is preferably used, and in a case where the monolithic ceramic electronic component is a thermistor, a semiconductor ceramic such as a spinel ceramic is preferably used, for example.

As described above, the external electrodes 28 and 29 are provided on at least the pair of end surfaces 17 and 18 of the component body 12. In this preferred embodiment, the external electrodes 28 and 29 include a portion that goes around and extends over a portion of each of the principal surfaces 13 and 14 and the side surfaces 15 and 16.

Although not illustrated, the external electrodes 28 and 29 preferably include a primary coating and a plating layer formed on the primary coating. As the conductive material for the primary coating, for example, Cu, Ni, Ag, Pd, Ag—Pd alloy, Au, or other suitable material may preferably be used. The primary coating may be formed either by using a co-firing method that applies a conductive paste onto the component body 12 that has not been fired yet and firing the conductive paste simultaneously with the component body 12, or by using a post-firing method that applies and fires a conductive paste onto the component body 12 that has already been fired. Alternatively, the primary coating may be formed directly by plating, or may be formed by curing conductive resin including thermosetting resin.

The plating layer formed on the primary coating is preferably of a two-layer structure including Ni-plating and Sn-plating on top of the Ni-plating, for example.

Next, referring further to FIGS. 4 to 15, a manufacturing method for the monolithic ceramic capacitor 11 described above is described.

Figure 4:
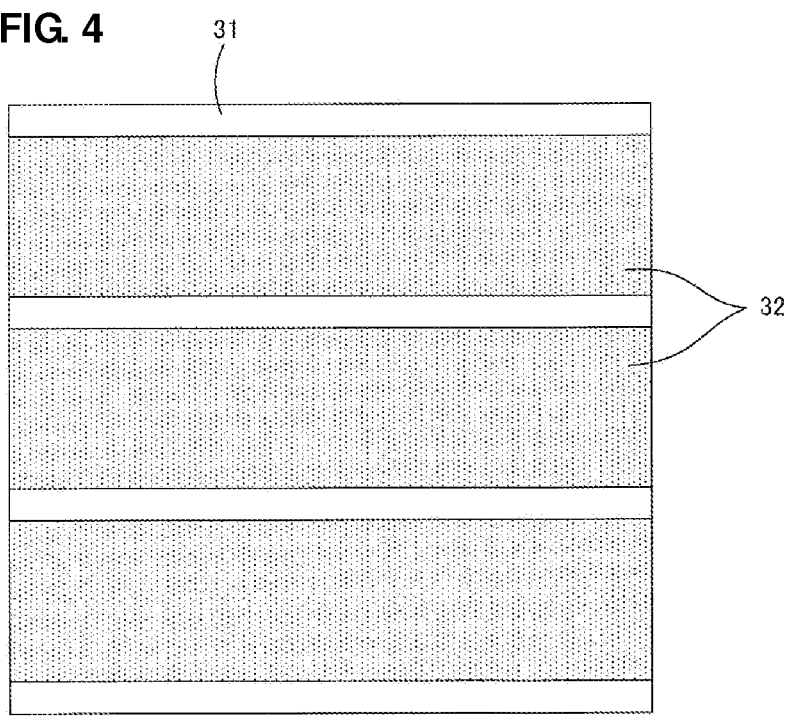
FIG. 4 is a plan view of each of ceramic green sheets which are prepared to obtain the green chip illustrated in FIG. 3 and on which an internal electrode pattern is formed.

First, as partially illustrated in FIG. 4, each of ceramic green sheets 31 that are to become the ceramic layers 25 are prepared. More specifically, the ceramic green sheets 31 are shaped by using a die coater, a gravure coater, a micro gravure coater, or other suitable device on a carrier film (not illustrated). The thickness of the ceramic green sheets 31 is preferably not more than about 3 μm, for example.

Next, similarly as illustrated in FIG. 4, a conductive paste is printed with a predetermined pattern on the ceramic green sheets 31. As a result, the ceramic green sheets 31 each provided with an internal electrode pattern 32 that is to become each of the internal electrodes 26 and 27 are obtained. More specifically, a plurality of rows of strip-shaped internal electrode patterns 32 are formed on the ceramic green sheets 31. The thickness of the internal electrode pattern 32 is preferably not more than about 1.5 μm, for example.

Figure 5A:
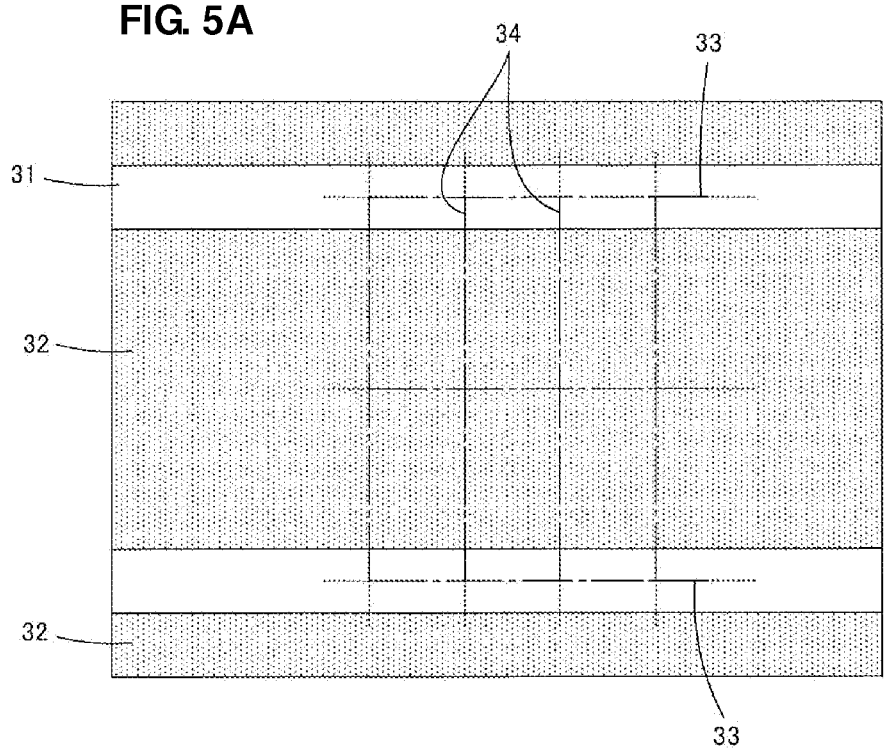
FIGS. 5A and 5B are plan views illustrating a step of stacking the ceramic green sheets illustrated in FIG. 4 while shifting the ceramic green sheets from each other by a predetermined distance.
Figure 5B:
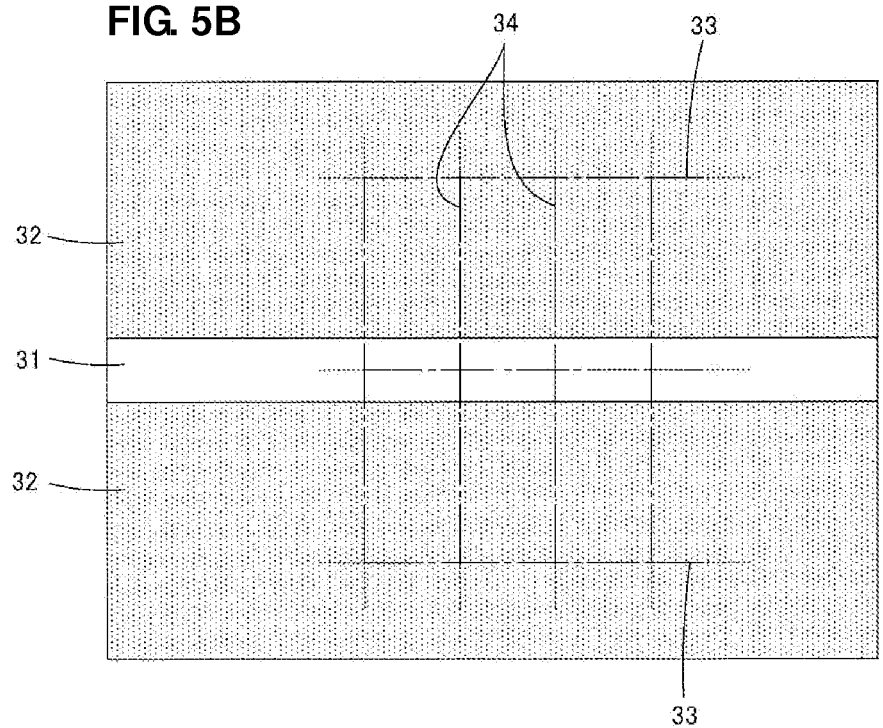

In FIGS. 5A and 5B, first cutting lines 33 along a first direction that is the longitudinal direction (the horizontal direction in FIGS. 5A and 5B) in which the strip-shaped internal electrode pattern 32 extends, and second cutting lines 34 along a second direction that is the width direction (the vertical direction in FIGS. 5A and 5B) perpendicular or substantially perpendicular to the cutting lines 33 are partially illustrated. The strip-shaped internal electrode pattern 32 has such a shape that two internal electrodes 26 and 27 coupled to each other through their lead sections are arranged contiguously along the longitudinal direction. FIGS. 5A and 5B are enlarged from FIG. 4.

Next, as illustrated in FIGS. 5A and 5B, a predetermined number of the ceramic green sheets 31 with the internal electrode pattern 32 formed as described above are stacked with a shift of a predetermined distance, that is, half the widthwise dimension of the internal electrode pattern 32, along the width direction, and a predetermined number of ceramic green sheets on which no conductive paste is printed and which serve as the outer layers are stacked on top and bottom of the resulting stack. Because the cutting lines 33 and 34 are illustrated in both FIGS. 5A and 5B, how to shift the ceramic green sheets 31 when stacking can be easily understood by comparison between FIGS. 5A and 5B.

Figure 6A:
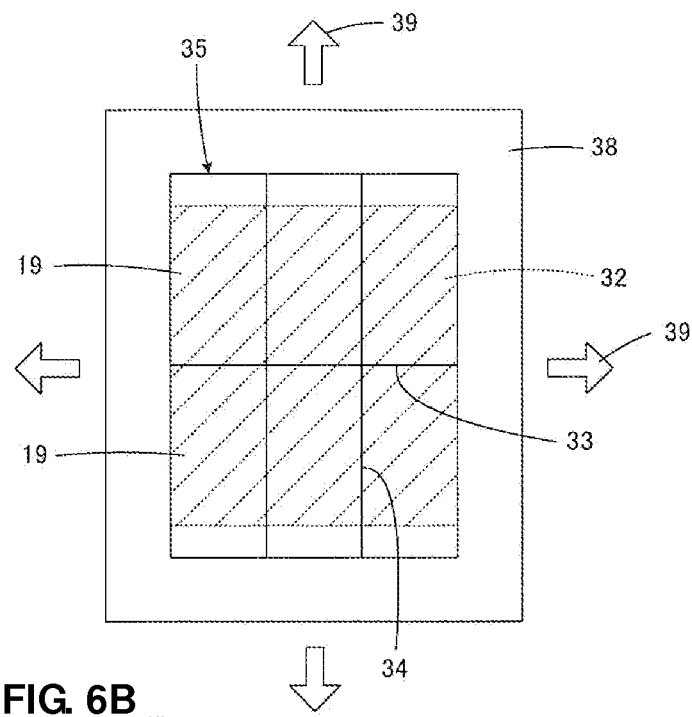
FIGS. 6A and 6B are respectively a plan view of a plurality of green chips obtained by cutting a mother block that is obtained by the stacking step illustrated in FIGS. 5A and 5B, and a plan view illustrating a state in which the green chips arrayed in the row and column directions in FIG. 6A have become spaced apart from each other.
Figure 6B:
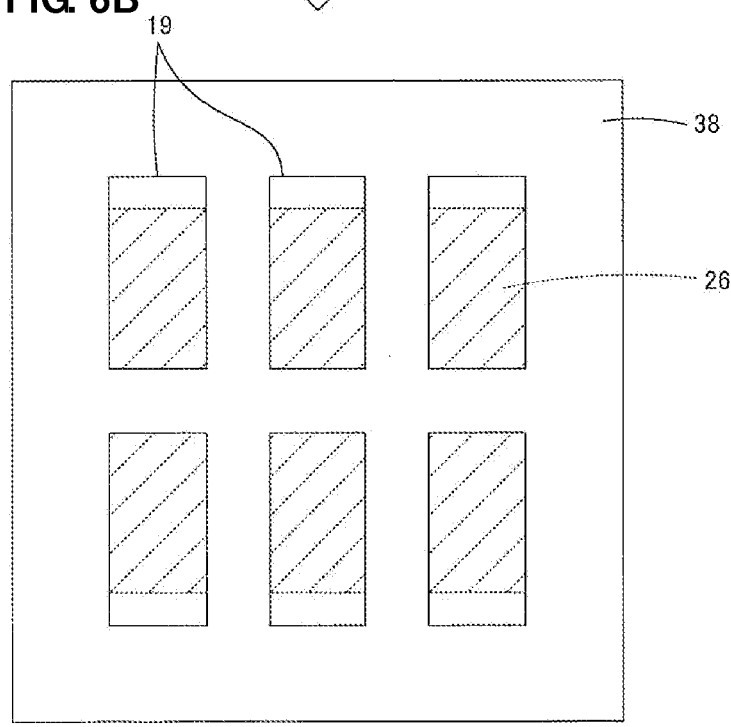

As a result of the stacking step described above, a mother block 35 illustrated in FIG. 6A is obtained. In FIGS. 6A and 6B, the uppermost internal electrode pattern 32 or internal electrode 26 located inside the mother block 35 is indicated by broken lines.

Next, the mother block 35 is pressed in the stacking direction by a method such as isostatic pressing.

Next, the mother block 35 is cut along the first cutting lines 34 and the second cutting lines 33 that are perpendicular or substantially perpendicular to each other. As a result, as illustrated in FIG. 6A, a plurality of green chips 19 being arrayed in the row and column directions are obtained. Dicing, force-cutting, laser cutting, or other suitable process is preferably used for this cutting. In drawings such as FIG. 6A, for reasons related to the creation of the drawings, a single mother block 35 is depicted as being so dimensioned that six green chips 19 are extracted from the mother block 35. However, in actuality, the mother block 35 is so dimensioned that more green chips 19 are extracted.

As illustrated singly in FIG. 3, each of the green chips 19 has a laminated structure including the plurality of ceramic layers 25 and the plurality of internal electrodes 26 and 27 which are in their raw state. The cut side surfaces 20 and 21 of the green chips 19 are surfaces that are produced by cutting along the first cutting lines 34, and the end surfaces 36 and 37 are surfaces that are produced by cutting along the second cutting lines 33. All of the internal electrodes 26 and 27 are exposed on the cut side surfaces 20 and 21. Only the first internal electrodes 26 are exposed on the end surface 36, and only the second internal electrodes 27 are exposed on the other end surface 37.

As illustrated in FIG. 6A, the green chips 19 arrayed in the row and column directions are affixed onto an adhesive sheet 38 having expandability. Then, the adhesive sheet 38 is expanded as indicated by an arrow 39 by an expander (not illustrated). As a result, as illustrated in FIG. 6B, the green chips 19 arrayed in the row and column directions become spaced apart from each other.

At this time, the adhesive sheet 38 is expanded to an extent that allows the green chips 19 to be smoothly tumbled without hitting each other in the tumbling step that will be performed later. Although depending on the dimensions of the green chips 19, as an example, the adhesive sheet 38 is expanded to about 160% of the original dimensions.

As the adhesive sheet 38 mentioned above, for example, an adhesive sheet made of polyvinyl chloride resin whose adhesive layer is given by an acrylic adhesive is used. The adhesive sheet 38 has such a plasticity that the adhesive sheet 38 does not completely return to the original shape once expanded. Therefore, handling of the adhesive sheet 38 that has been expanded is easy. For example, after the green chips 19 are obtained by cutting the mother block 35, there is a possibility that the cut side surfaces 20 and 21 or end surfaces 36 and 37 of the adjacent green chips 19 adhere to each other again owing to the binder included in the green chips 19. However, since the adhesive sheet 38 does not completely return to the original shape once expanded, it is possible to avoid a situation where the cut side surfaces 20 and 21 or the end surfaces 36 and 37 come into contact with and therefore adhere to each other again.

Next, a tumbling step is performed. In the tumbling step, the green chips 19 are tumbled to thereby make the first cut side surface 20 of each of the green chips 19 uniformly an open surface.

Figure 7A:
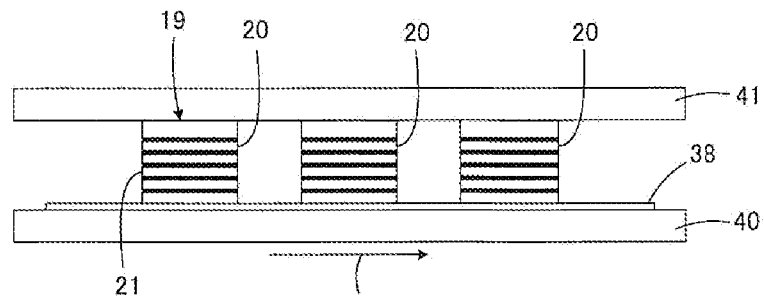
FIGS. 7A and 7B are views as seen from the direction of the end surface of the green chips, illustrating a tumbling step of tumbling the green chips illustrated in FIG. 6B.

Accordingly, as illustrated in FIG. 7A, the green chips are placed on a support base 40 together with the adhesive sheet 38. On the other hand, a tumbling action plate 41 is placed so as to be able to act on the green chips 19 from above. The support base 40 and the tumbling action plate 41 are preferably made of silicone rubber.

Figure 7B:
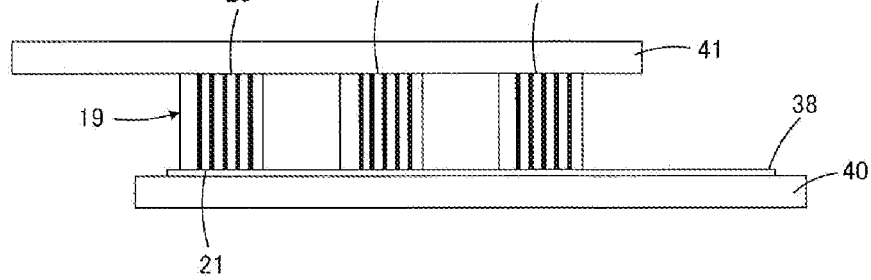

Next, the support base 40 is moved in the direction of an arrow 42 with respect to the tumbling action plate 41. As a result, as illustrated in FIG. 7B, the green chips 19 are rotated by 90 degrees all at once, resulting in a state in which their first cut side surface 20 faces upwards. When the tumbling action plate 41 is removed in this state, the first cut side surface 20 becomes an open surface.

To perform the above-mentioned tumbling of the green chips 19 more smoothly, the tumbling operation may be performed after transferring the green chips 19 from the adhesive sheet 38 onto an adhesive rubber sheet. In this case, it is preferable that the adhesive rubber sheet have an elastic coefficient of not more than about 50 MPa and a thickness of not more than about 5 mm, for example.

Figure 8:
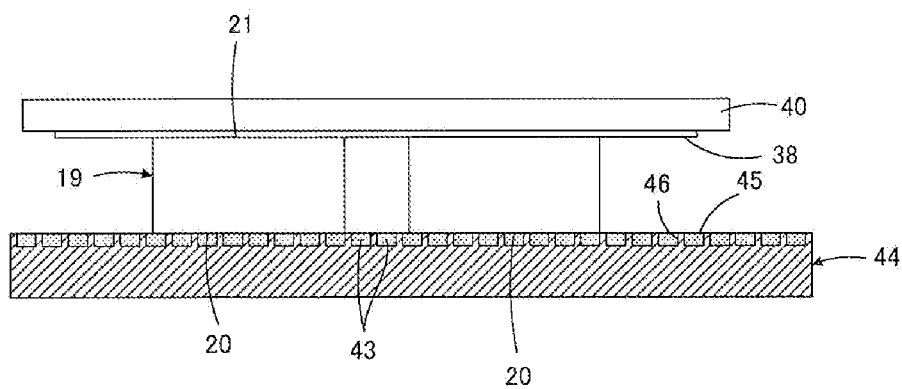
FIG. 8 is a view as seen from the direction of the principal surface of the green chips, illustrating an applying step of applying a ceramic paste to form a raw first ceramic protective layer on a first cut side surface of the green chips that has become an open surface as a result of the tumbling step illustrated in FIGS. 7A and 7B.

Next, an applying step is performed as required as illustrated in FIG. 8. In the applying step, a ceramic paste 43 is applied to the first cut side surface 20 of the green chips 19 that has become an open surface to thereby form the first ceramic protective layer 22 (see FIG. 2) in its raw state.

Figure 9:
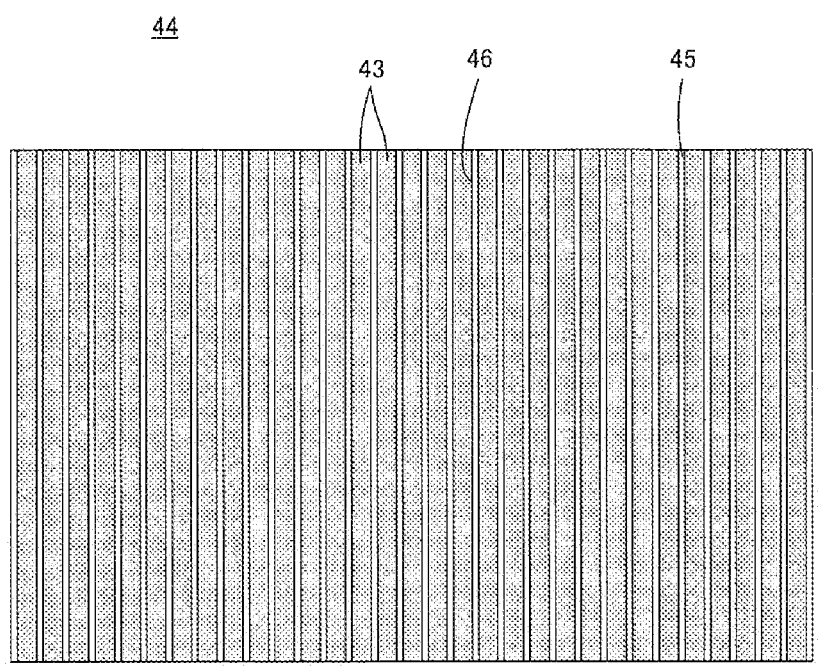
FIG. 9 is a plan view of an application plate illustrated in FIG. 8.

For that purpose, an application plate 44 illustrated in FIGS. 8 and 9 is prepared. The application plate 44 has an application surface 45 that abuts against the cut side surface 20 of the green chips 19. The application surface is provided with a recess 46 to hold the ceramic paste 43. The recess 46 is filled with the ceramic paste 43. In this preferred embodiment, as clearly illustrated in FIG. 9, the recess 46 is given by a plurality of grooves.

In performing the applying step, as illustrated in FIG. 8, the following steps are performed: abutting the application surface 45 of the application plate 44 against the cut side surface 20 of the green chips 19, and bringing the ceramic paste 43 filled in the recess 46 into contact with the cut side surface 20; and transferring the ceramic paste 43 filled in the recess 46 to the cut side surface 20 of the green chips 19 while separating the green chips 19 from the application plate 44. In this case, capillary action or the like also works so that the ceramic paste is applied to the entire cut side surface 20 of the green chips 19. On the other hand, the ceramic paste 43 is not applied to surfaces of the green chips 19 other than the cut side surface 20. The thickness of the ceramic paste 43 applied can be adjusted by adjusting the width, depth, or arrangement pitch of the recess 46, the viscosity of the ceramic paste 43 or the solids content in the ceramic paste 43, and so on. Also, the green chip 19 side may be placed at the bottom and the ceramic paste 43 side may be placed at the top so as to facilitate transfer of the ceramic paste 43 toward the green chips 19 by gravity.

If the application plate 44 is simply brought closer to or separated away from the green chips 19, the ceramic paste 43 becomes stringy when separating the application plate 44, resulting in problems such as the ceramic paste 43 being thick at the center and thin at the four corners, and contact marks being left in the portion where the cut side surface 20 and the application surface 45 makes contact. In some cases, it is not possible to apply the ceramic paste 43 at uniform thickness because of such problems.

To reduce such problems, the following step is performed. That is, when separating the green chips 19 from the application plate 44, the green chips 19 and the application plate 44 are moved relative to each other in the direction in which the cutting side surface 20 extends, in a state where the ceramic paste 43 is connected to both the green chips 19 and the application plate 44.

Figure 10:
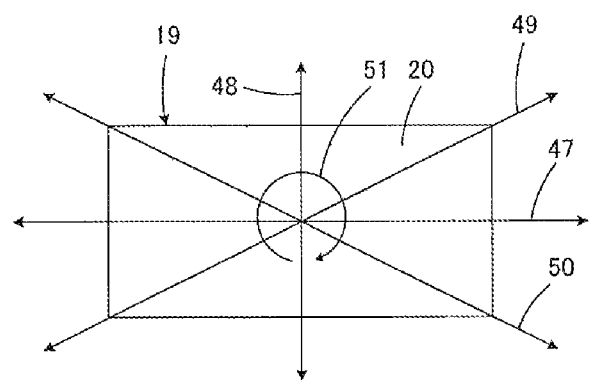
FIG. 10 is a view as seen from the direction of the cut side surface of each green chip, illustrating a step of moving the green chip and the application plate relative to each other in the direction in which the cut side surface extends, which is performed is the applying step illustrated in FIG. 8.

As illustrated in FIG. 10, the possible forms of the above-mentioned relative movement include a reciprocating motion along the long side of the cutting side surface 20, a reciprocating motion 48 along the short side, a reciprocating motion 49 or 50 along the diagonal, a circular or elliptical motion 51, a composite motion of these motions, or a motion along a random direction. In particular, by combining the reciprocating motion 49 along the diagonal with the reciprocating motion 50 along the diagonal, it is easy to apply a sufficient amount of ceramic paste so as to extend over the four corners of the cut side surface 20 where the applied thickness of the ceramic paste tends to become thin. Therefore, it is easy to secure a predetermined thickness or more of ceramic paste at the four corners, and an improvement in the moisture resistance of the obtained monolithic ceramic capacitor 11 can be anticipated.

To apply the ceramic paste 43 with uniform thickness, the applying step may be executed in a plurality of times. For example, after the ceramic paste 43 is dried once in a state where the contact marks of the application plate 44 remain, the cut side surface 20 side of the green chips 19 is further dipped in a ceramic paste film that is formed in a flat shape at uniform thickness. As a result, the contact marks of the application plate 44 disappear, making it possible to apply the ceramic paste at uniform thickness.

Desirably, the viscosity of the ceramic paste 43 is sufficiently low to allow the ceramic paste 43 to be smoothly transferred from within the recess 46 to the green chips 19, and is sufficiently high to allow surface tension to present the shape of the raw ceramic protective layer 22 formed by the ceramic paste 43 from being fluidized. The preferred value of viscosity at about 10 rpm as measured with an E-type viscometer is about 100 mPa to about 10000 mPa. The viscosity of the ceramic paste 43 can be adjusted by adjusting the ratio between the solvent and the binder contained in the ceramic paste 43, the kind of the binder, or the like.

Figure 11:
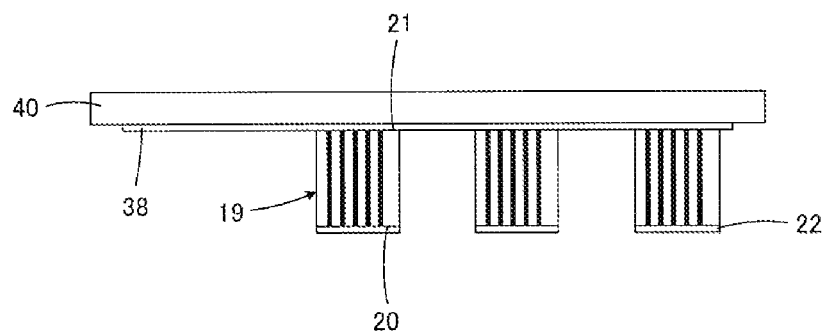
FIG. 11 is a view as seen from the direction of the end surface of the green chips, illustrating a state in which the raw first ceramic protective layer has been formed on the first cut side surface of the green chips as a result of the applying step illustrated in FIG. 8.

FIG. 11 illustrates a state in which, while the green chips 19 are supported by the support base 40 via the adhesive sheet 38, the first ceramic protective layer 22 in its raw state is formed on the first cut side surface 20 of the green chips 19 as a result of the above-mentioned applying step.

After the applying step, a drying step is performed as required. In the drying step, for example, the green chips 19 on which the first ceramic protective layer 22 has been formed are put in an oven that is set at about 120° C. for about five minutes, for example. If a hot-air oven is used at this time, drying begins at the surface of the ceramic paste 43 that defines the ceramic protective layer 22, and proceeds from the peripheral portion where the thickness is relatively small. Consequently, the applied thickness of the ceramic paste 43 tends to become non-uniform. To reduce such an inconvenience, it is preferable to use an oven whose heat source is a far-infrared heater or a near-infrared heater. Use of a far-infrared heater or a near-infrared heater can prevent non-uniformity of the applied thickness because the ceramic paste 43 is heated substantially uniformly all the way on the inside.

Next, a tumbling step similar to the step described above with reference to FIGS. 7A and 7B is performed. That is, the green chips 19 are tumbled to thereby uniformly make the second cut side surface 21 of each of the green chips 19 an open surface.

Figure 12A:
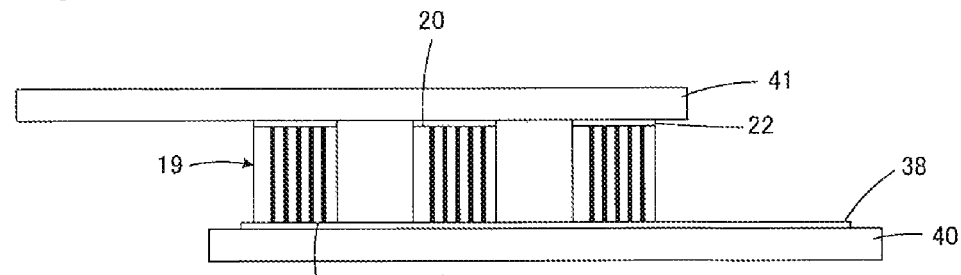
FIGS. 12A and 12B are views as seen from the direction of the end surface of the green chips, illustrating a tumbling step of tumbling the green chips illustrated in FIG. 11 again.

Accordingly, as illustrated in FIG. 12A, the tumbling action plate 41 is placed so as to be able to act on the green chips 19 supported by the support base 40 via the adhesive sheet 38 from above.

Figure 12B:
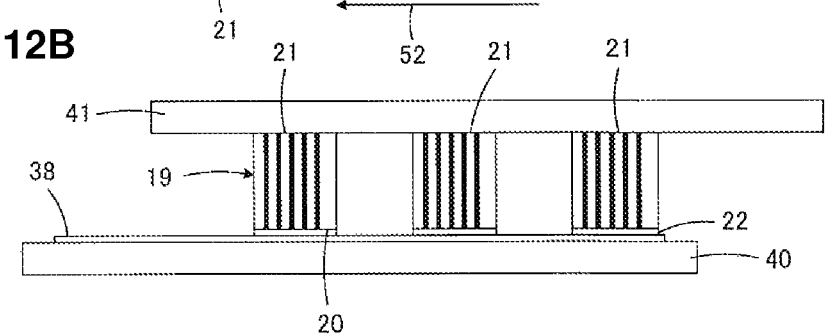

Next, the support base 40 is moved in the direction of an arrow 52 with respect to the tumbling action plate 41. As a result, rotating the green chips 19 all at once by 90 degrees is repeated twice, resulting in a state as illustrated in FIG. 12B in which the second cut side surface 21 of each of the green chips 19 faces upwards. When the tumbling action plate 41 is removed in this state, the second cut side surface 21 becomes an open surface.

Figure 13:
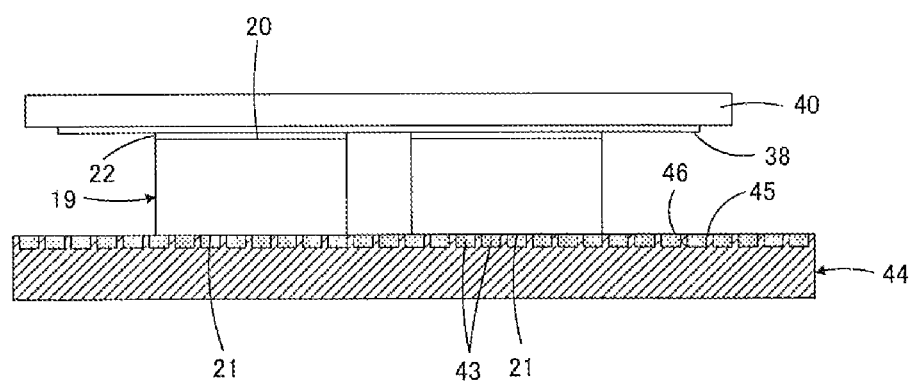
FIG. 13 is a view as seen from the direction of the principal surface of the green chips, illustrating an applying step of applying the ceramic paste to form a raw second ceramic protective layer on a second cut side surface of the green chips that has become an open surface as a result of the tumbling step illustrated in FIGS. 12A and 12B.

Next, an applying step is performed as illustrated in FIG. 13. In the applying step, the ceramic paste 43 is applied to the second cut side surface 21 of the green chips 19 that has become an open surface, thereby forming the second ceramic protective layer 23 (see FIG. 2) in its raw state. In this step, in a manner similar to the step described above with reference to FIG. 8, the application plate 44 is prepared, the application surface 45 of the application plate 44 is abutted against the cut side surface 21 of the green chips 19, and the ceramic paste 43 filled in the recess 46 is brought into contact with the cut side surface 21. Then, the ceramic paste 43 filled in the recess 46 is transferred to the cut side surface 21 of the green chips 19 while separating the green chips 19 from the application plate 44.

The following step is performed also in the above-mentioned applying step performed for the second time. That is, when separating the green chips 19 from the application plate 44, the green chips 19 and the application plate 44 are moved relative to each other in the direction in which the cutting side surface 20 extends, in a state where the ceramic paste 43 is connected to both the green chips 19 and the application plate 44.

Figure 14:
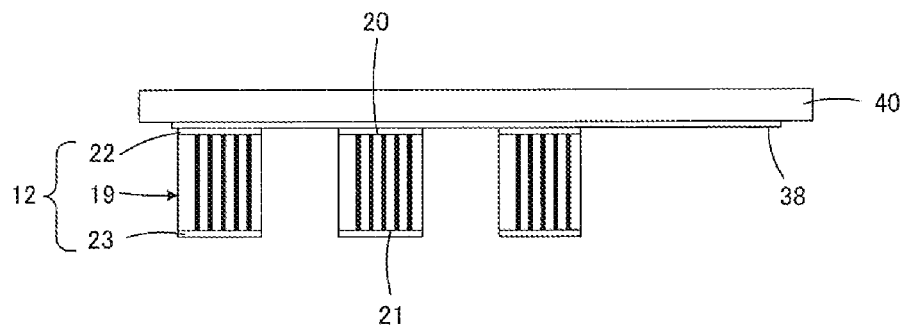
FIG. 14 is a view as seen from the direction of the end surface of the green chips, illustrating raw component bodies obtained as the raw second ceramic protective layer is formed on the second cut side surface of the green chips as a result of the applying step illustrated in FIG. 13.

FIG. 14 illustrates a plurality of raw component bodies 12 in a state in which, with the green chips 19 being supported by the support base 40 via the adhesive sheet 38, the first and second ceramic protective layers 22 and 23 in their raw state are formed on the first and second cut side surfaces 20 and 21 of the green chips 19, respectively, as a result of the two applying steps described above.

A drying step is performed as required also after the applying step performed for the second time.

Figure 15:
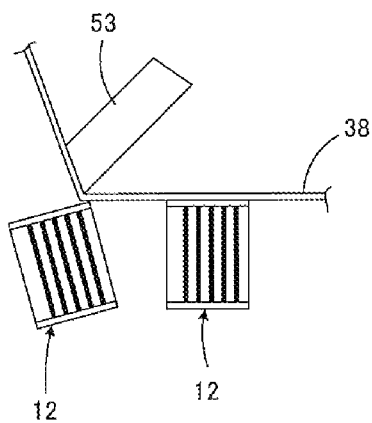
FIG. 15 is a view as seen from the direction of the end surface of the raw component bodies, illustrating a step of collecting each raw component body from an adhesive sheet illustrated in FIG. 14.

Next, after the raw component bodies 12 are detached from the support base 40 together with the adhesive sheet 38, as illustrated in FIG. 15, each of the raw component bodies 12 is collected by peeling the adhesive sheet 38 from the raw component body 12. In this step, a knife edge 53 is pressed against the adhesive sheet 38 from above while making the raw component body hang down from the adhesive sheet 38, thereby bending the adhesive sheet 38 so as to protrude downwards. As the adhesive sheet 38 is bent, the raw component body 12 comes off the adhesive sheet 38, drops downwards, and is collected.

Next, the raw component body 12 is fired. Although also depending on the ceramic material included in the ceramic green sheets 31 and the ceramic paste 43 or the metallic material included in the internal electrodes 26 and 27, the firing temperature is selected preferably to be within the range of about 900° C. to about 1300° C., for example.

Next, by applying and firing a conductive paste onto the both end surfaces 17 and 18 of the component body 12 that has been fired, and further applying plating as required, the external electrodes 28 and 29 are formed. It is also possible to apply a conductive paste to the component body 12 in its raw state, and perform firing of the conductive paste simultaneously with firing of the raw component body 12.

In this way, the monolithic ceramic capacitor 11 illustrated in FIG. 1 is completed.

While the present invention has been described above in association with a specific preferred embodiment, other various modifications are possible within the scope of the present invention.

For example, the following modifications are also possible for the application plate 44 illustrated in FIGS. 8, 9, and 13. FIGS. 16, 17, 18, and 19 illustrate first, second, third, and fourth modifications of the application plate, respectively. In FIGS. 16 to 19, elements corresponding to the elements illustrated in FIGS. 8, 9, and 13 are denoted by the same symbols, and a repetitive description is omitted.

Figure 16:
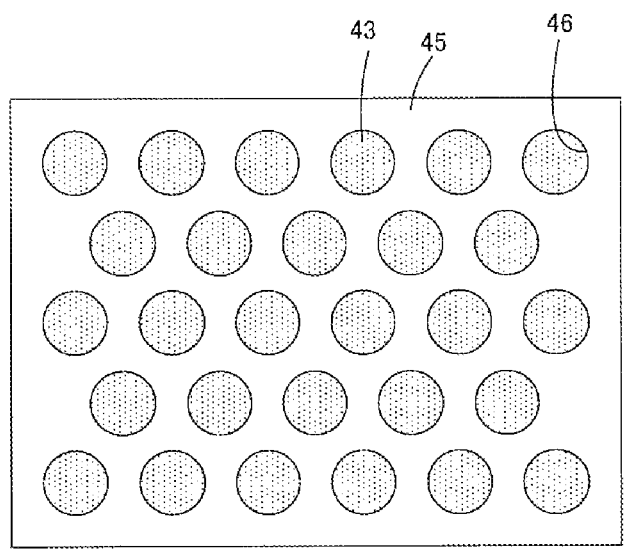
FIG. 16 is a plan view of an application plate according to a first modification, illustrating a second preferred embodiment of the present invention.

An application plate 44a illustrated in FIG. 16 includes an application surface 45 that abuts against the side surface of the green chips. The application surface 45 is provided with a plurality of recesses 46 having, for example, a circular plane shape. The plurality of recesses 46 are distributed at substantially equal intervals across the application surface 45. The recesses 46 are filled with the ceramic paste 43.

Figure 17:
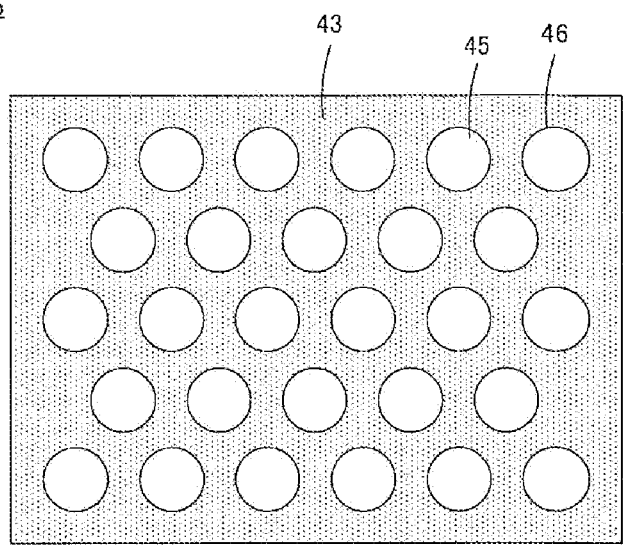
FIG. 17 is a plan view of an application plate according to a second modification, illustrating a third preferred embodiment of the present invention.

An application plate 44b illustrated in FIG. 17 includes an application surface 45 that abuts against the side surface of the green chips. The application surface 45 is defined by the top surface of a plurality of protrusions having, for example, a circular plane shape. The protrusions are distributed in the plane direction of the application plate 44b. The portion other than the protrusions serves as a recess 46. The recess 46 is filled with the ceramic paste 43.

Figure 18:
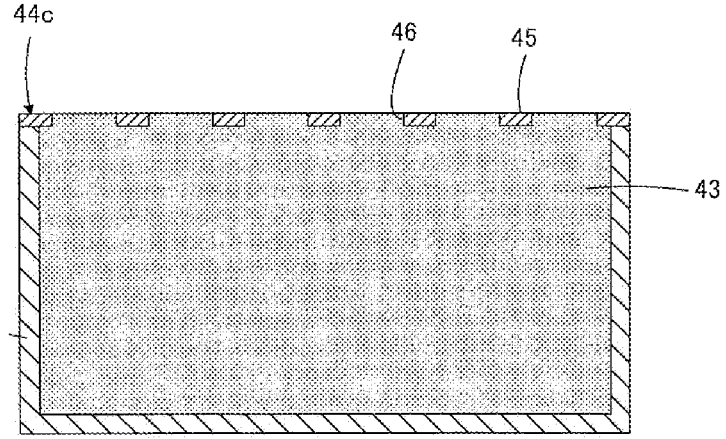
FIG. 18 is a plan view of an application plate according to a third modification, illustrating a fourth preferred embodiment of the present invention.

As in the case of the application plate 44a illustrated in FIG. 16, an application plate 44c illustrated in FIG. 18 includes an application surface 45 that abuts against the side surface of the green chips, and the application surface 45 is provided with a plurality of recesses 46. The plurality of recesses 46 are distributed at substantially equal intervals across the application surface 45. One of the unique features of the application plate 44c resides in that the recesses 46 are defined by through-holes, and the application plate 44c is arranged to close the top opening of a paste vessel 54 containing the ceramic paste 43.

According to the application plate 44c illustrated in FIG. 18, as compared with the application plates 44, 44a, and 44b described above, owing to the absence of the bottom of the recesses 46, the contact area between the ceramic paste 43 and the application plate 44c inside the recesses 46 can be made smaller. Thus, it is easier to transfer the ceramic paste 43 to the green chip 19 side.

Figure 19:
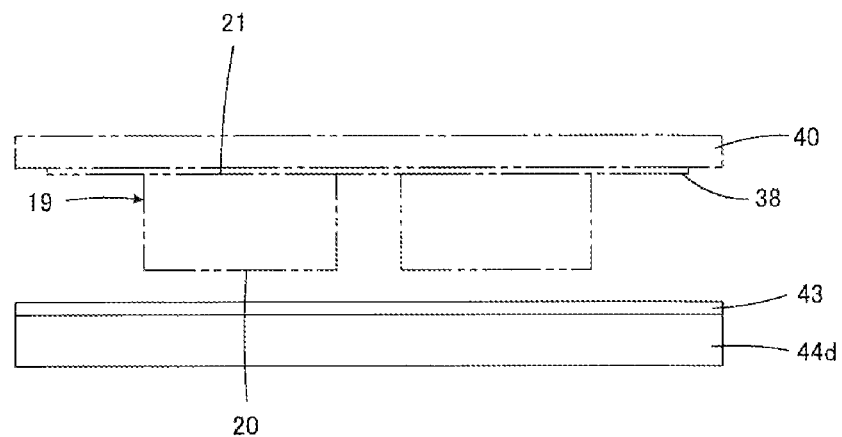
FIG. 19 is a plan view of an application plate according to a fourth modification, illustrating a fifth preferred embodiment of the present invention.

An application plate 44d illustrated in FIG. 19 preferably has a shape of a simple flat plate. A relatively thin layer made of the ceramic paste 43 is provided on top of the upper principal surface of the application plate 44d. By bringing the green chips 19 indicated by imaginary lines into contact with the layer made of the ceramic paste 43, the ceramic paste 43 can be applied to, for example, the first cut side surface 20 of the green chips 19.

Figure 20:
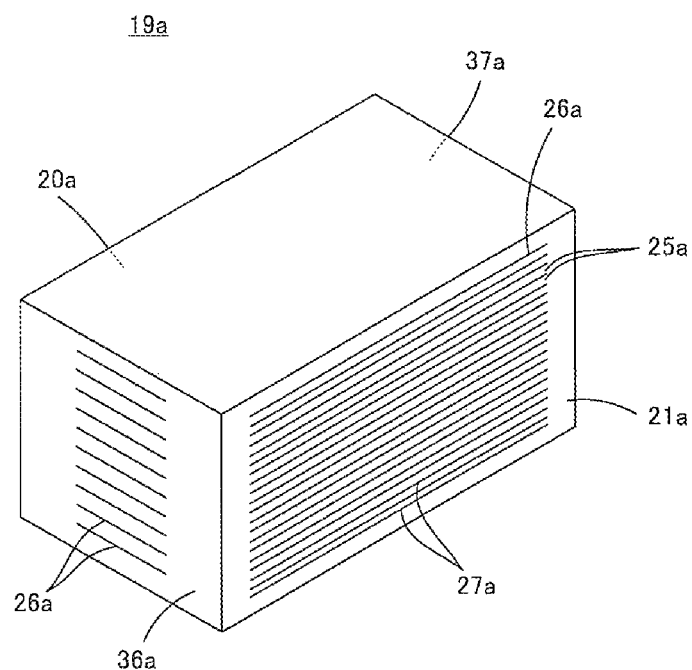
FIG. 20 is a perspective view of the outward appearance of a green chip, illustrating a sixth preferred embodiment of the present invention.
Figure 21A:
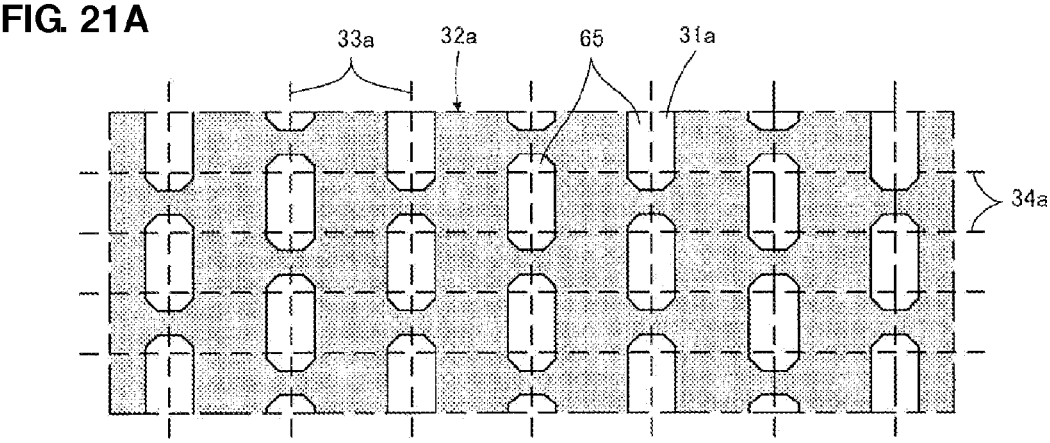
FIGS. 21A and 21B are plan views of ceramic green sheets which are prepared to obtain the green chip illustrated in FIG. 20 and on which an internal electrode pattern is formed.
Figure 21B:
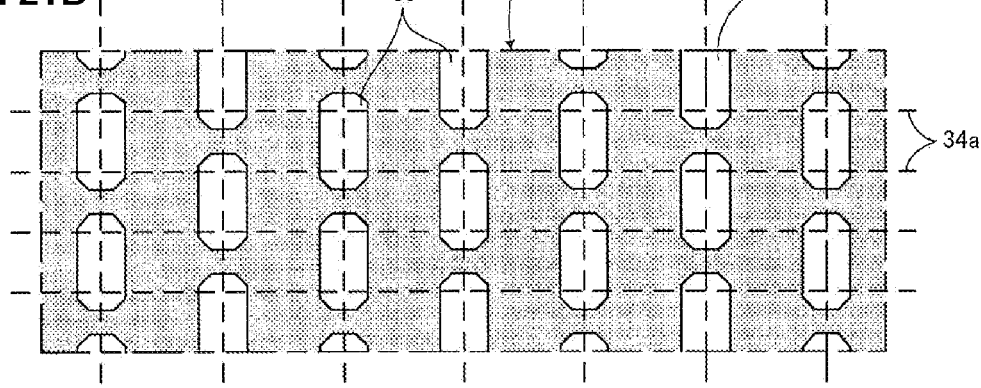
Figure 22A:
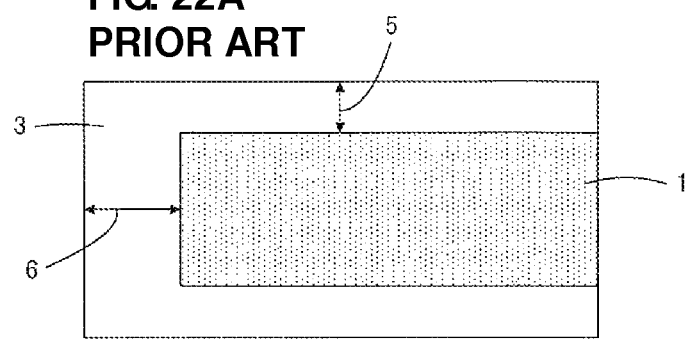
FIGS. 22A and 22B are respectively a plan view of a first ceramic green sheet on which a first internal electrode is formed, and a plan view of a second ceramic green sheet on which a second internal electrode is formed, illustrating a typical manufacturing method for a monolithic ceramic capacitor according to the related art.
Figure 22B:
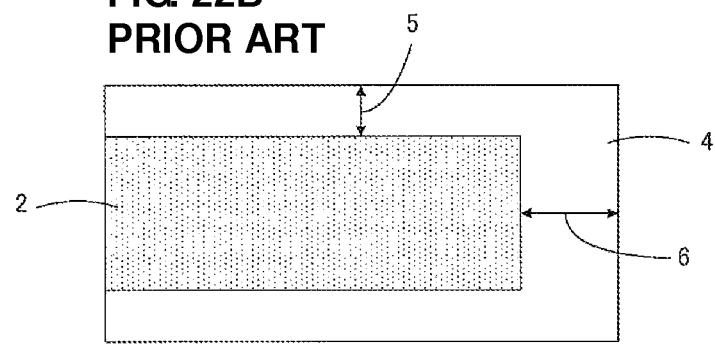
Figure 23:
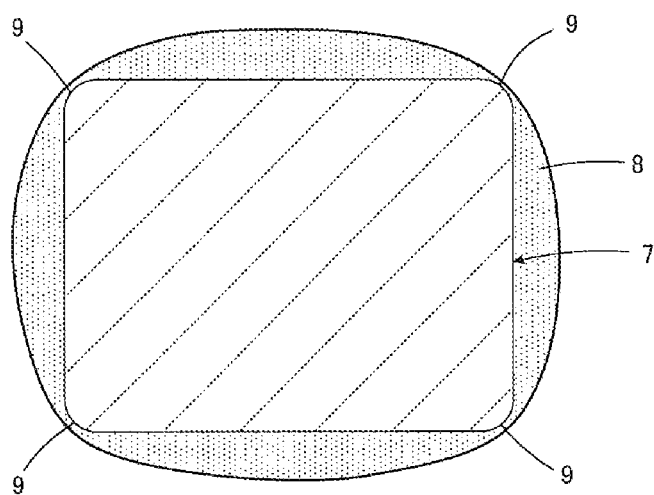
FIG. 23 is a cross-sectional view of a laminate for explaining problems that can be encountered in a manufacturing method for a monolithic ceramic capacitor according to the related art, illustrating a phenomenon that can occur when a ceramic slurry is applied to the laminate.

The internal electrodes and the internal electrode pattern can be also modified as follows, for example. FIG. 20 is a perspective view corresponding to FIG. 3, illustrating the outward appearance of a green chip 19a. FIGS. 21A and 21B are plan views corresponding to FIGS. 5A and 5B, illustrating ceramic green sheets 31a on which an internal electrode pattern 32a is formed. The ceramic green sheets 31a are prepared to obtain the green chip 19a illustrated in FIG. 20.

As illustrated in FIG. 20, the green chip 19a has a laminated structure including a plurality of ceramic layers 25a and a plurality of first and second internal electrodes 26a and 27a which are in a raw state. The first and second internal electrode 26a and 27a are placed alternately in the stacking direction.

On the other hand, as illustrated in FIGS. 21A and 21B, the internal electrode pattern 32a formed on the ceramic green sheets 31a preferably has a meshed configuration, and also preferably has such a form that the portion to become an opposing section as the major portion of the internal electrodes 26a, and the portion to become an opposing section as the major portion of the internal electrodes 27a are arranged contiguously while being alternately connected in the vertical direction.

FIGS. 21A and 21B illustrate first cutting lines 34a along a first direction, that is, the horizontal direction, and second cutting lines 33a along a second direction perpendicular or substantially perpendicular to the first direction, that is, the vertical direction. In the green chip 19a mentioned above, cut side surfaces 20a and 21a preferably are surfaces that are produced by cutting along the first cutting lines 34a, and end surfaces 36a and 37a are surfaces that are produced by cutting along the second cutting lines 33a. All of the internal electrodes 26a and 27a are exposed on the cut side surfaces 20a and 21a. Only the first internal electrodes 26a are exposed on the end surface 36a, and only the second internal electrodes 27a are exposed on the other end surface 37a.

In the meshed internal electrode pattern 32a illustrated in FIGS. 21A and 21B, perforations 65 where no internal electrode pattern is to be formed are arranged in a staggered manner. The perforations 65 preferably have an octagonal shape that is elongated in the vertical direction. The portion to become the lead section for each of the internal electrodes 26a and 27a is located between the perforations 65 that are adjacent to each other in the vertical direction.

In stacking the ceramic green sheets 31a, as illustrated in FIGS. 21A and 21B, the ceramic green sheets 31a are stacked with a shift so that their internal electrode patterns 32a are shifted from each other in the horizontal direction by a distance corresponding to the horizontal spacing of the perforations 65.

A mother block obtained by the above-mentioned stacking is cut along the cutting lines 33a and 34a illustrated in FIGS. 21A and 21B, and the green chip 19a as illustrated in FIG. 20 is obtained. Each of the second cutting lines 33a is located so as to divide the perforations 65 in halves in the horizontal direction, and the first cutting lines 34a are located in such a way that two cutting lines 34a cross a single perforation 65.

In the preferred embodiment described above with reference to FIG. 20 and FIGS. 21A and 21B, the lead section of each of the internal electrodes 26a and 27a is narrower in width than the opposing section of each of the internal electrodes 26a and 27a, and extends with a predetermined width. The area of the opposing section that is contiguous to the lead section gradually decreases in width so as to become substantially equal to the width of the lead section.

In the above-mentioned preferred embodiment, by modifying the shape of the perforations 65, the shape of the lead section of each of the internal electrodes 26a and 27a, and the shape of the end of the opposing section that is contiguous to the lead section can be modified in various ways. For example, it is also possible to modify the shape of the perforations 65 to a rectangle.

In the aforementioned preferred embodiment, after the green chips 19 are obtained from the mother block 35 by cutting the mother block 35 along each of the cutting lines 33 and 34 illustrated in FIGS. 5A and 5B, the ceramic paste 43 used to form the ceramic protective layers 22 and 23 is applied to the cut side surfaces 20 and 21. This step can be also modified as follows.

That is, a first cutting step is performed first. In the first cutting step, after the mother block 35 is obtained, the mother block 35 is cut only along the first cutting lines 34 illustrated in FIGS. 5A and 5B to thereby obtain a plurality of rod-shaped green block bodies, with the internal electrodes 26 and 27 being exposed on the cut side surfaces 20 and 21 that are produced by cutting along the first cutting lines 34.

Next, the rod-shaped green block bodies are affixed to an adhesive sheet having expandability, and an applying step including a tumbling step, which is substantially the same as the above-mentioned applying step including the tumbling step described with reference to FIGS. 7A to 14 is performed. As a result, the ceramic paste 43 is applied to the cut side surfaces 20 and 21, and the ceramic protective layers 22 and 23 in their raw state are formed on the rod-shaped green block bodies.

Next, a second cutting step is performed. In the second cutting step, each of the rod-shaped green block bodies on which the raw ceramic protective layers 22 and 23 have been formed is cut along the second cutting lines 33 perpendicular or substantially perpendicular to the above-mentioned first direction, thereby obtaining a plurality of raw component bodies 12.

Thereafter, as in the aforementioned preferred embodiment, each of the raw component bodies 12 is fired, and the same steps as those mentioned above are subsequently performed, thereby completing the monolithic ceramic capacitor 11.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A manufacturing method for a monolithic ceramic electronic component, comprising the steps of:
    preparing a mother block including a plurality of ceramic green sheets that are stacked on each other, and an internal electrode pattern arranged along each of a plurality of interfaces between the ceramic green sheets;
    performing a first cutting including cutting the mother block along a first cutting line to obtain a plurality of rod-shaped green block bodies, the rod-shaped green block bodies each having a laminated structure including a plurality of ceramic layers and a plurality of internal electrodes that are in a raw state, the internal electrodes being exposed on a cut side surface that is produced by cutting along the first cutting line;
    applying a ceramic paste to the cut side surface to form a raw ceramic protective layer;
    performing a second cutting including cutting each of the rod-shaped green block bodies on which the raw ceramic protective layer has been formed along a second cutting line extending in a direction perpendicular or substantially perpendicular to the first cutting line to obtain a plurality of raw component bodies that are each a component body in a raw state; and
    firing each of the raw component bodies; wherein
    the applying step includes the steps of:
        preparing an application plate that holds the ceramic paste;
        bringing the ceramic paste held by the application plate into contact with the cut side surface of each of the rod-shaped green block bodies; and
        transferring the ceramic paste to the cut side surface of each of the rod-shaped green block bodies, by moving each of the rod-shaped green block bodies and the application plate relative to each other in a direction in which the cut side surface extends while separating each of the rod-shaped green block bodies from the application plate in a state in which the ceramic paste is connected to both of each of the rod-shaped green block bodies and the application plate.

2. The manufacturing method for a monolithic ceramic electronic component according to claim 1, wherein:
    the rod-shaped green block bodies cut in the first cutting step are arrayed in a predetermined direction;
    the applying step further includes the step of tumbling the rod-shaped green block bodies in a state in which the rod-shaped green block bodies arrayed in the predetermined direction are spaced apart from each other, to make the cut side surface of each of the rod-shaped green block bodies uniformly an open surface; and
    in the applying step, the ceramic paste is simultaneously applied to the cut side surface of each of the rod-shaped green block bodies that has become the open surface as a result of the tumbling step.

3. The manufacturing method for a monolithic ceramic electronic component according to claim 1, wherein the application plate includes an application surface that abuts against the cut side surface and is provided with a recess to hold the ceramic paste, the recess being filled with the ceramic paste.

4. The manufacturing method for a monolithic ceramic electronic component according to claim 1, wherein the ceramic paste has a viscosity of about 100 mPa to about 10000 mPa at about 10 rpm as measured with an E-type viscometer.

5. The manufacturing method for a monolithic ceramic electronic component according to claim 1, wherein the step of preparing the mother block includes the steps of:
    preparing the ceramic green sheets;
    forming the internal electrode pattern on each of the ceramic green sheets; and
    stacking the ceramic green sheets while shifting the ceramic green sheets from each other by a predetermined distance in a predetermined direction.

6. The manufacturing method for a monolithic ceramic electronic component according to claim 1, further comprising the step of forming an external electrode on a predetermined surface of the component body so as to be electrically connected to a specific one of the internal electrodes.

* * * * *